(12) United States Patent
Casagrande

(10) Patent No.: US 10,006,980 B2
(45) Date of Patent: Jun. 26, 2018

(54) BEACON LOCALIZATION METHOD

(71) Applicant: The Swatch Group Research and Development Ltd, Marin (CH)

(72) Inventor: Arnaud Casagrande, Bole (CH)

(73) Assignee: The Swatch Group Research and Development Ltd., Marin (CH)

( * ) Notice: Subject to any disclaimer, the term of this patent is extended or adjusted under 35 U.S.C. 154(b) by 0 days. days.

(21) Appl. No.: 15/296,570

(22) Filed: Oct. 18, 2016

(65) Prior Publication Data
US 2017/0139029 A1 May 18, 2017

(30) Foreign Application Priority Data
Nov. 18, 2015 (EP) ..................................... 15195140

(51) Int. Cl.
| | | |
|---|---|---|
| H04W 24/00 | (2009.01) | |
| G01S 1/04 | (2006.01) | |
| H04W 64/00 | (2009.01) | |
| G01S 5/02 | (2010.01) | |
| G01S 5/06 | (2006.01) | |
| G01S 13/87 | (2006.01) | |
| G01S 19/42 | (2010.01) | |

(52) U.S. Cl.
CPC ................ *G01S 1/04* (2013.01); *G01S 5/021* (2013.01); *G01S 5/0205* (2013.01); *G01S 5/06* (2013.01); *G01S 13/878* (2013.01); *H04W 64/003* (2013.01); *G01S 19/42* (2013.01)

(58) Field of Classification Search
CPC .................................................. H04W 64/00
See application file for complete search history.

(56) References Cited

U.S. PATENT DOCUMENTS

| | | | | |
|---|---|---|---|---|
| 5,974,038 | A * | 10/1999 | Shou ....................... | H04B 1/708 370/320 |
| 6,574,478 | B1 * | 6/2003 | Mortensen ............... | G01S 5/06 455/11.1 |
| 7,295,159 | B1 | 11/2007 | Belcea et al. | |
| 2001/0030625 | A1 * | 10/2001 | Doles ........................ | G01S 5/02 342/387 |

(Continued)

OTHER PUBLICATIONS

European Search Report (with Written Opinion) dated May 19, 2016 in European Application 15195140.7 filed on Nov. 18, 2015 (with English Translation of Categories of Cited Documents).

*Primary Examiner* — Justin Lee
(74) *Attorney, Agent, or Firm* — Oblon, McClelland, Maier & Neustadt, L.L.P.

(57) ABSTRACT

The method for localizing a beacon consists in transmitting, by a first transceiver, an initiation signal, which is received by second and third transceivers, in calculating, by means of said initiation signal, errors between a reference frequency of the first transceiver and reference frequencies of the second and third transceivers, in transmitting, by the beacon, a first pulsed signal, which is received by the first, second and third transceivers, in transmitting, by the first transceiver, a second pulsed signal, which is received by the second and third transceivers, in calculating differences in the times-of-flight of the first and second pulsed signals, each time-of-flight difference being calculated in a time base provided by a local oscillator of the first transceiver by means of reference frequency errors, and in calculating a beacon position by means of the times-of-flight.

8 Claims, 5 Drawing Sheets

(56) References Cited

U.S. PATENT DOCUMENTS

| | | |
|---|---|---|
| 2012/0164966 A1 | 6/2012 | Casagrande et al. |
| 2013/0214976 A1 | 8/2013 | Michel et al. |
| 2015/0168543 A1 | 6/2015 | Tian et al. |
| 2015/0185309 A1 | 7/2015 | Pu et al. |

\* cited by examiner

BEACON LOCALIZATION METHOD

This application claims priority from European Patent Application No 15195140.7 of Nov. 18, 2015, the entire disclosure of which is hereby incorporated herein by reference.

FIELD OF THE INVENTION

The invention relates to the technical field of systems and methods for localizing beacons. A beacon is any device used for the purposes of localization, which can be located and identified by suitable means.

BACKGROUND OF THE INVENTION

Many localization methods exist, of which the best known is based on GPS (global positioning system). GPS includes several synchronised satellites, fitted with atomic clocks. These satellites permanently transmit pseudo-random code modulated signals, accurately dated by means of said atomic clocks. A transceiver that picks up signals from at least four of these satellites can therefore calculate the propagation time of the signals, in order to deduce therefrom its distance from the satellites and then its position by trilateration. However, this system has the drawback of requiring the use of atomic clocks, which are very expensive to produce because of their great stability. Moreover, this system cannot be used inside and is sometimes difficult to utilise in very built-up environments with very tall buildings, since a line of sight to the sky is required to pick up data from the various satellites.

SUMMARY OF THE INVENTION

The invention therefore proposes a localization method that does not require the use of stable frequency references from satellites.

Therefore, the invention relates to a beacon localization method by means of a first, a second and a third transceivers, each of the beacon, the first, the second and the third transceiver comprising a local oscillator theoretically oscillating at a same reference frequency but in practice oscillating at different reference frequencies due to frequency drifts, the method including the following steps:
- transmission, by a first transceiver, of an initiation signal, said initiation signal being received by second and third transceivers,
- calculation, by means of the initiation signal, of errors between the reference frequency of the first transceiver and the reference frequencies of the second and third transceivers,
- transmission, by the beacon, of a first pulsed signal, said first pulsed signal being received by the first, second and third transceivers,
- transmission, by a first transceiver, of a second pulsed signal, said second pulsed signal being received by the second and third transceivers,
- calculation, by means of reference frequency errors, of at least three differences between the times-of-flight of the first and second pulsed signals, each time difference being calculated in the time base provided by the local oscillator of the first transceiver
- calculating a beacon position by means of the time-of-flight differences.

Particular steps of the localization method, considered individually or in technically possible combinations are defined in the dependent claims.

Advantageously, the method allows the position of the beacon to be calculated by solving a system of at least three equations expressing the relations between the differences in times-of-flight of the first and second pulsed signals, and the distances between the beacon and the three transceivers. However, as the reference frequencies of the transceivers have potentially drifted compared to the theoretical reference frequency, these times-of-flight must be expressed in a single time base. This is made possible by knowing the errors between the reference frequencies of the various transceivers. Thus, the three transceivers may be fitted with low stability oscillators, for example non-temperature compensated quartz oscillators, without distorting the positioning calculation.

BRIEF DESCRIPTION OF THE DRAWINGS

The objects, advantages and features of the beacon localization method will appear more clearly in the following description, with reference to the drawings, in which.

DETAILED DESCRIPTION OF THE INVENTION

In the following description, all those elements of the self-synchronizing beacon localization system that are well known to those skilled in the art in this technical field will be described only in a simplified manner.

Figure 1:
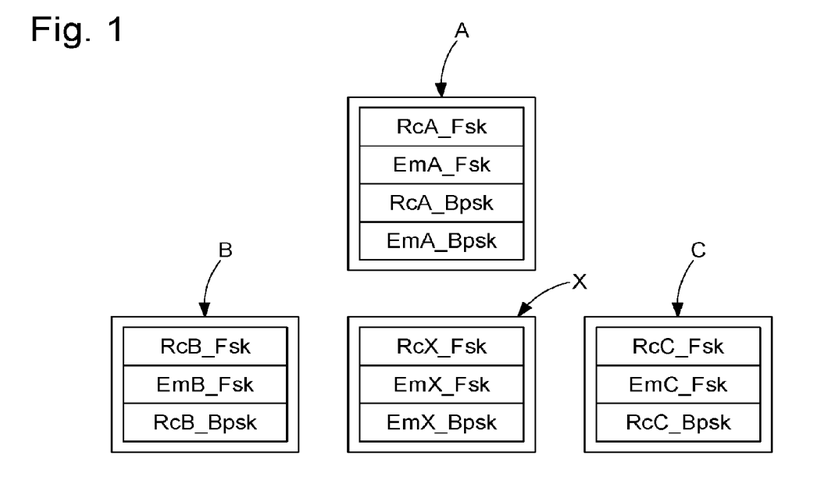
FIG. 1 is a schematic view of a localization system for implementing the method according to a non-limiting embodiment of the invention.

FIG. 1 is a schematic view of a 2D beacon localization system, i.e. a system for localizing a beacon located on the Earth's surface. 2D localization, also called geo-localization, can position a beacon on a map using its geographical coordinates. The 2D localization system includes a beacon X whose position is unknown, and a first transceiver A, a second transceiver B and a third transceiver C whose positions are known.

First transceiver A, second transceiver B, third transceiver C and beacon X each comprise a local oscillator oscillating at a reference frequency $f_{ref}$, for example 26 MHz, used to provide a time base to their electronic components. Theoretically, this reference frequency $f_{ref}$ is common to the four devices A, B, C, X. In practice, the local oscillators are subject to frequency drifts, which will be greater the lower the quality of the oscillator. The reference $f_{refA}$ refers to the reference frequency of first transceiver A, $f_{refB}$ to the reference frequency of second transceiver B, $f_{refC}$ to the reference frequency of third transceiver C, $f_{refX}$ to the reference frequency of beacon X. The localization system allows precise localization of the beacon despite these frequency drifts, as is explained below.

As represented in FIG. 1, the first, second, third transceivers A, B, C and beacon X each include a module for receiving signals modulated by frequency shift keying (FSK) RcA_Fsk, RcB_Fsk, RcC_Fsk, RcX_Fsk. For ease of reading, these modules are called FSK receiver modules, and a carrier that is modulated in frequency with a digital sequence using the principle of FSK modulation is referred to as an FSK signal. For example, when a carrier of frequency $f_0$ is modulated by the 1 state of a binary digital sequence, the resulting signal is of frequency $f_0+\Delta f_0$; when the carrier is modulated by the 0 state of the binary sequence, the resulting signal is of frequency $f_0-\Delta f_0$. The carrier frequency $f_0$ is said to be the central frequency of the FSK modulation. The FSK receiver modules of transceivers A, B, C and of beacon X are, for example, similar to the FSK modulation signal transceiver described in the specification of EP Patent 2239860 B1, configured in low rate mode.

Further, the first, second and third transceivers A, B, C and beacon X each comprise a module for transmitting FSK signals EmA_Fsk, EmB_Fsk, EmC_Fsk, EmX_Fsk, called the FSK transmitter module. Together the FSK transmission and receiver modules form a communication system. Modules EmB_Fsk, EmC_Fsk of the second and third transceivers B, C communicate to transceiver A the intermediate results of correlations calculated in transceivers B and C. The carrier frequency on which the FSK modulations are based is called communication frequency $f_0$. Communication frequency $f_0$ is, for example, at 2.4 GHz, and the frequency deviation encoding the 0 or 1 states of a binary sequence is 50 kHz.

Further, first, second and third transceivers A, B, C each comprise a module for receiving binary phase shift keyed signals RcA_Bpsk, RcB_Bpsk, RcC_Bpsk. This modulation is known as BPSK. For ease of reading, these modules are called BPSK receiver modules, and a carrier that is modulated in phase with a binary sequence using the principle of BPSK modulation is referred to as a BPSK signal. For example, when a carrier at frequency $f_0$ is modulated by the 1 state of a binary sequence, the resulting signal is of zero-phase; when the carrier is modulated by a 0 state of the binary sequence, the resulting signal is of phase $\pi$.

Further, first transceiver A and beacon X each comprise a module for transmitting BPSK signals EmA_Bpsk, EmX_Bpsk, called the BPSK transmitter module. Together the BPSK transmission and receiver modules form a communication system. The carrier frequency on which the BPSK modulations are based is the communication frequency $f_0$ which has a value, for example of 2.4 GHz.

Figure 2:
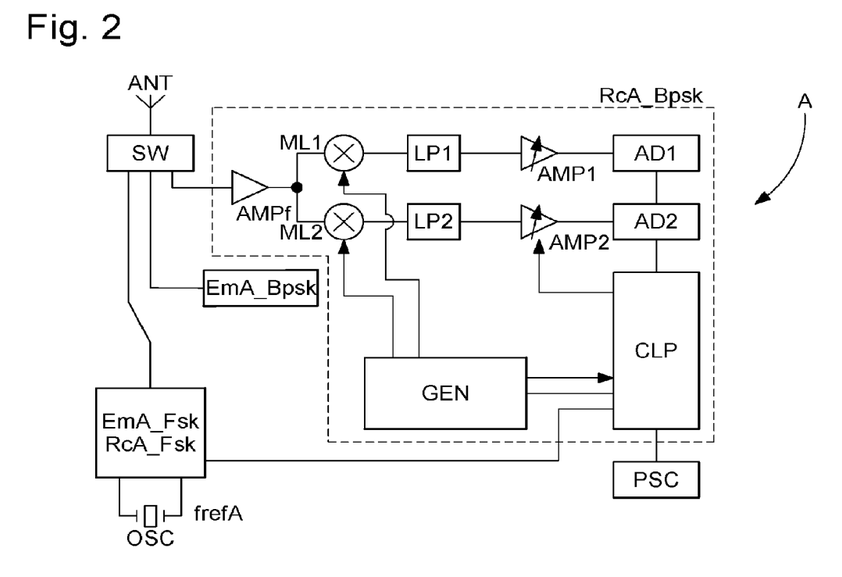
FIG. 2 is a schematic view of a transceiver of the localization system of FIG. 1.

FIG. 2 is a schematic view of a non-limiting example of first transceiver A. First transceiver A comprises an antenna ANT for transmitting/receiving FSK and BPSK radio signals, and a switch SW connected to antenna ANT for blocking or allowing the transmission and reception of the various signals.

Further, as set out above, first transceiver A comprises an FSK transmitter module EmA_Fsk and an FSK receiver module RcA_Fsk, for high sensitivity FSK signal transmission and reception in low rate mode. FSK transmitter module EmA_Fsk and receiver module FSK RcA_Fsk are, for example, based on the EM Microelectronics transceiver EM9209. FSK transmitter module EmA_Fsk and receiver module FSK RcA_Fsk are connected to a first terminal of switch SW and use as time base the reference frequency $f_{refA}$ provided by a quartz oscillator OSC of first transceiver A.

The second and third transceivers B, C also each include an FSK transmitter module EmB_Fsk and EmC_FSK and an FSK receiver module RcB_Fsk and RcC_FSK for high sensitivity FSK signal transmission and reception in low rate mode. These transmission and receiver modules are also based on the EM Microelectronics transceiver EM9209.

First transceiver A also comprises a BPSK receiver module RcA_Bpsk. BPSK receiver module RcA_Bpsk comprises a low noise amplifier (or LNA) AMPf connected to a second terminal of switch SW for amplifying a BPSK signal picked up by antenna ANT.

BPSK receiver module RcA_Bpsk then comprises a demodulation stage for demodulating the incoming BPSK signal. The demodulation stage comprises a first mixer ML1 whose first input is connected to an output of LNA AMPf, and whose second input is connected to a low phase noise synthesizer GEN belonging to first transceiver A. The demodulation stage also includes a second mixer ML2 whose first input is connected to the output of LNA AMPf, and whose second input is connected to synthesizer GEN. Synthesizer GEN supplies to first mixer ML1 a demodulation signal LOi at communication frequency $f_0$, and to second mixer ML1 a quadrature signal LOq with demodulation signal LOi. The first and second mixers ML1, ML2 then output a signal that is the sum of the useful signal and a signal modulated at frequency $2 \cdot f_0$.

The demodulation stage then comprises a first low-pass filter LP1 and a second low-pass filter LP2, respectively connected to the outputs of first mixer ML1 and second mixer ML2. Low-pass filters LP1, LP2 filter the spectral components at $2 \cdot f_0$ of the signals output by mixers ML1, ML2.

BPSK receiver module RcA_Bpsk then comprises a sampling stage for sampling the incoming demodulated BPSK signal. The sampling stage comprises a first variable gain amplifier AMP1 and a second variable gain amplifier AMP2, respectively connected to the outputs of first low-pass filter LP1 and second low pass filter LP2. The sampling stage then comprises a first analogue-to-digital converter (ADC) AD1 and a second analogue-to-digital converter AD2, respectively connected to the first variable gain amplifier AMP1 and second variable gain amplifier AMP2. It is noted that the gain of variable gain amplifiers AMP1, AMP2 is regulated by a programmable circuit CLP of the field programmable gate array type, belonging to first transceiver A. The variable gain amplifiers AMP1, AMP2 attenuate the input signal of analogue-to-digital converters AD1, AD2 in order to decrease the resolution of analogue-to-digital converters AD1, AD2 without affecting their dynamic performance.

Further, first transceiver A includes a BPSK transmitter module EmA_Bpsk, including a BPSK modulator.

Finally, first transceiver A comprises a digital signal processor PSC, for example for performing reference frequency error calculations, autocorrelation calculations, or positioning calculations for beacon X.

In a non-limiting embodiment, second transceiver B and third transceiver C are identical to first transceiver A. Alternatively, they comprise all the components of first transceiver A, with the exception of the BPSK transmitter module.

Figure 3:
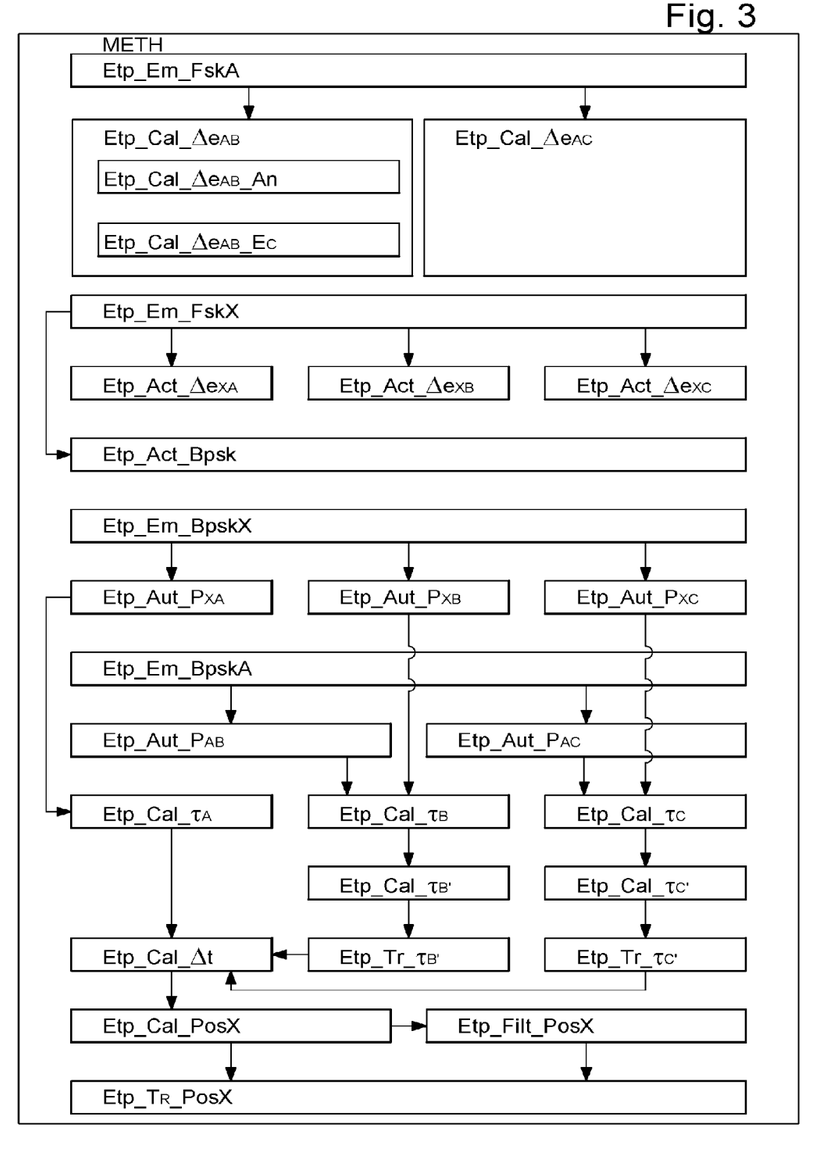
FIG. 3 shows a block diagram illustrating the steps of the method according to a non-limiting embodiment of the invention.

FIG. 3 is a schematic view of the steps of a non-limiting embodiment of a method METH for 2D localization of beacon X, suitable for implementation by the localization system presented above.

Figure 4:
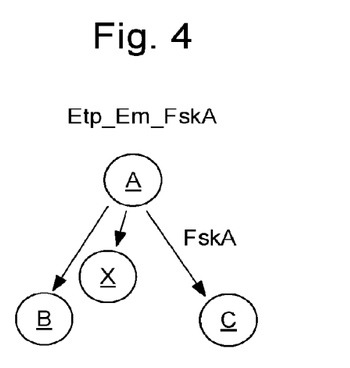
FIG. 4 is a schematic view of the localization system of FIG. 1, implementing a step of the method of FIG. 3.

In a step Etp_Em_FskA represented in FIG. 4, FSK transmitter module EmA_Fsk of first transceiver A transmits a first long-range, low rate FSK signal FskA (the rate is less than 10 Kbits per second, for example). This signal is called the "initiation signal". It is noted that any other type of modulation could be used. Initiation signal FskA includes a request for localization of beacon X, followed by an identification address (for example, a hexadecimal address) for first transceiver A. An "FSK request/address signal" means a carrier modulated in FSK with a digitally coded request/address. Initiation signal FskA is not only received by beacon X, but also by second transceiver B and third transceiver C. Indeed, the receiver modules FSK RcX_Fsk, RcA_Fsk, RcB_Fsk, RcC_Fsk of beacon X and of the three transceivers A, B and C are initially in detection mode. In this mode, FSK receiver modules RcX_Fsk, RcA_Fsk, RcB_Fsk, RcC_Fsk continuously pick up the FSK signals that reach them, particularly signals from any nearby interfering devices, and attempt to identify particular FSK signals, such as initiation signal FskA. It is noted that this scenario is not limiting. If it is desired that beacon X uses little energy, it can be made to operate in a different mode. In this mode, initiation signal FskA is sent from beacon X at a certain moment, and this signal is directly followed by a pulsed BPSK (or other type of modulation) signal. Beacon X can therefore be in permanent standby mode and only wake from time to time (based on an internal timer or an event, for example) to be placed in transmission only mode (thereby advantageously avoiding energy consumption in receiver mode).

In a step Etp_Cal_$\Delta e_{AB}$, second transceiver B calculates a range of error $\Delta e_{AB}$ between its reference frequency $f_{refB}$ and that of first transceiver A $f_{refA}$, using incoming initiation signal FskA. To achieve this, step Etp_Cal_$\Delta e_{AB}$ includes the following sub-steps:

In a sub-step Etp_Cal_$\Delta e_{AB}$_An, second transceiver B analyses the dynamic evolution of the frequency spectrum of the signals continuously received by its FSK receiver module RcB_Fsk, said frequency spectrum being centred on the aforementioned communication frequency $f_0$. The frequency spectrum is advantageously obtained by discrete Fourier transform of the incoming signals. When a line subjected to characteristic frequency hopping (on the order of a few kilohertz for example) is identified, this line is attributed to initiation signal FskA.

In a sub-step Etp_Cal_$\Delta e_{AB}$_Ec, second transceiver B calculates the deviation between this characteristic line and the central frequency of the frequency spectrum. Indeed, if the reference frequency of first transceiver A and the reference frequency of second transceiver B were perfectly synchronized, the characteristic line would be at the centre of the frequency spectrum. However, because the resolution of the frequency spectrum is limited, the deviation cannot be precisely calculated: it is only possible to calculate a range of deviation. This deviation range is the range of error $\Delta e_{AB}$ between reference frequency $f_{refB}$ of second transceiver B and that $f_{refA}$ of first transceiver A.

In a step Etp_Cal_$\Delta e_{AC}$, third transceiver C calculates a range of error $\Delta e_{AC}$ between its reference frequency $f_{refC}$ and that of first transceiver A $f_{refA}$, using incoming initiation signal FskA. This step is performed in a similar manner to step Etp_Cal_$\Delta e_{AB}$.

Figure 5:
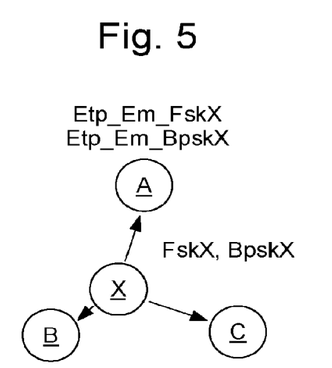
FIG. 5 is a schematic view of the localization system of FIG. 1, implementing steps of the method of FIG. 3.
Figure 6:
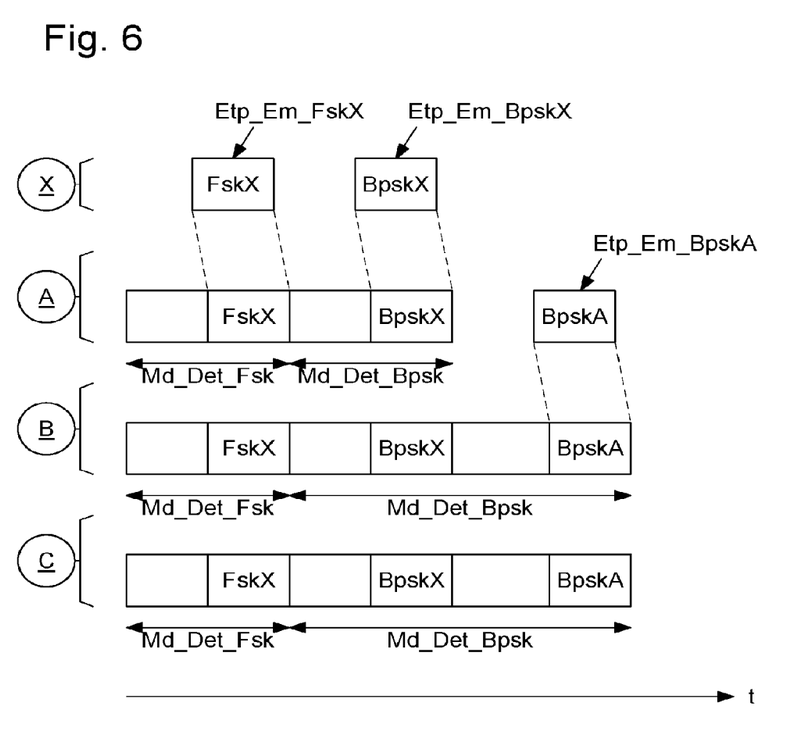
FIG. 6 shows a temporal diagram representing the states of the transceivers of the localization system of FIG. 1, during the method of FIG. 3.
Figure 7:
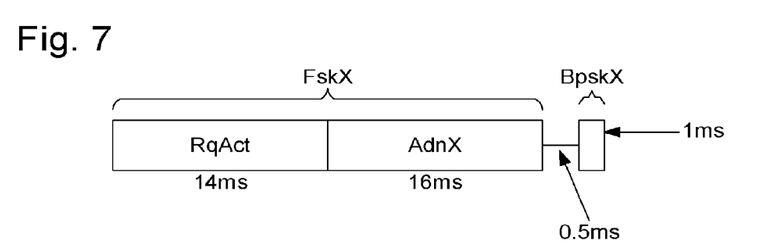
FIG. 7 is a schematic view of a signal transmitted by a beacon to be localized in a step of the method of FIG. 3.

In a step Etp_Em_FskX represented in FIG. 5 and in FIG. 6, FSK transmitter module EmX_Fsk of beacon X transmits a second long-range, low rate FSK signal FskX (the rate is less than 10 Kbits per second, for example). This signal is called the "activation signal". Activation signal FskX includes a request for activation RqAct of BPSK receiver means RcA_Bpsk, RcB_Bpsk, RcC_Bpsk of transmitters A, B, C, followed by an identification address AdrX (for example a hexadecimal address) for beacon X. An example activation signal FskX is schematically represented in FIG. 7. In the example shown, the transmission of activation signal FskX lasts 30 milliseconds. The first 14 milliseconds of activation signal FskX include activation request RqAct, while the last 16 milliseconds include the identification address AdrX. Activation signal FskX is received by each of the three transceivers A, B and C, as their FSK receiver modules RcA_Fsk, RcB_Fsk, RcC_Fsk are still in detection mode Md_Det_Fsk, as illustrated in FIG. 6.

In a step Etp_Cal_$\Delta e_{XA}$, first transceiver A calculates a range of error $\Delta e_{XA}$ between its reference frequency $f_{refA}$ and that $f_{refX}$ of beacon X, using the incoming activation signal FskX. This step is performed in a similar manner to step Etp_Cal_$\Delta e_{AB}$.

In a step Etp_Cal_$\Delta e_{XB}$, second transceiver B calculates a range of error $\Delta e_{XB}$ between its reference frequency $f_{refB}$ and that $f_{refX}$ of beacon X, using the incoming activation signal FskX. This step is performed in a similar manner to step Etp_Cal_$\Delta e_{AB}$.

In a step Etp_Cal_$\Delta e_{XC}$, third transceiver C calculates a range of error $\Delta e_{XC}$ between its reference frequency $f_{refC}$ and that $f_{refX}$ of beacon X, using the incoming activation signal FskX. This step is performed in a similar manner to step Etp_Cal_$\Delta e_{AB}$.

In a step Etp_Act_Bpsk, in response to reception of activation request RqAct, transceivers A, B, C activate their BPSK receiver modules RcA_Bpsk, RcB_Bpsk, RcC_Bpsk, which are then in detection mode Md_Det_Bpsk, as represented in FIG. 6. In this mode, BPSK receiver modules RcA_Bpsk, RcB_Bpsk, RcC_Bpsk continuously pick up the BPSK signals that reach them, particularly signals from any nearby interfering devices, and attempt to identify particular BSPK signals.

In a step Etp_Em_BpskX represented in FIG. 5 and in FIG. 6, BPSK transmitter module EmX_Bpsk of beacon X transmits a first pulsed signal BpskX at a high rate (for example 1 Mb per second) and in a narrow band (for example the width of a Bluetooth channel). First pulsed signal BpskX takes the form of a carrier at communication frequency $f_0$ (in the time base of beacon X) modulated in phase by a sequence of pseudo-random signals. A pseudo-random sequence is a periodic binary sequence with random values within a period. An example of first pulsed signal BpskX is represented schematically in FIG. 7. It is noted that any other type of modulation (for example QPSK, FSK, GFSK or OOK) may be envisaged. In the example represented, first pulsed signal BpskX is transmitted 0.5 milliseconds after activation signal FskX, and lasts 1 millisecond. First pulsed signal BpskX is thus very short with respect to activation signal FskX. First pulsed signal BpskX is received by the three transceivers A, B, C, whose BPSK receiver modules RcA_Bpsk, RcB_Bpsk, RcC_Bps are in detection mode Md_Det_Bpsk, as represented in FIG. 6.

Figure 8:
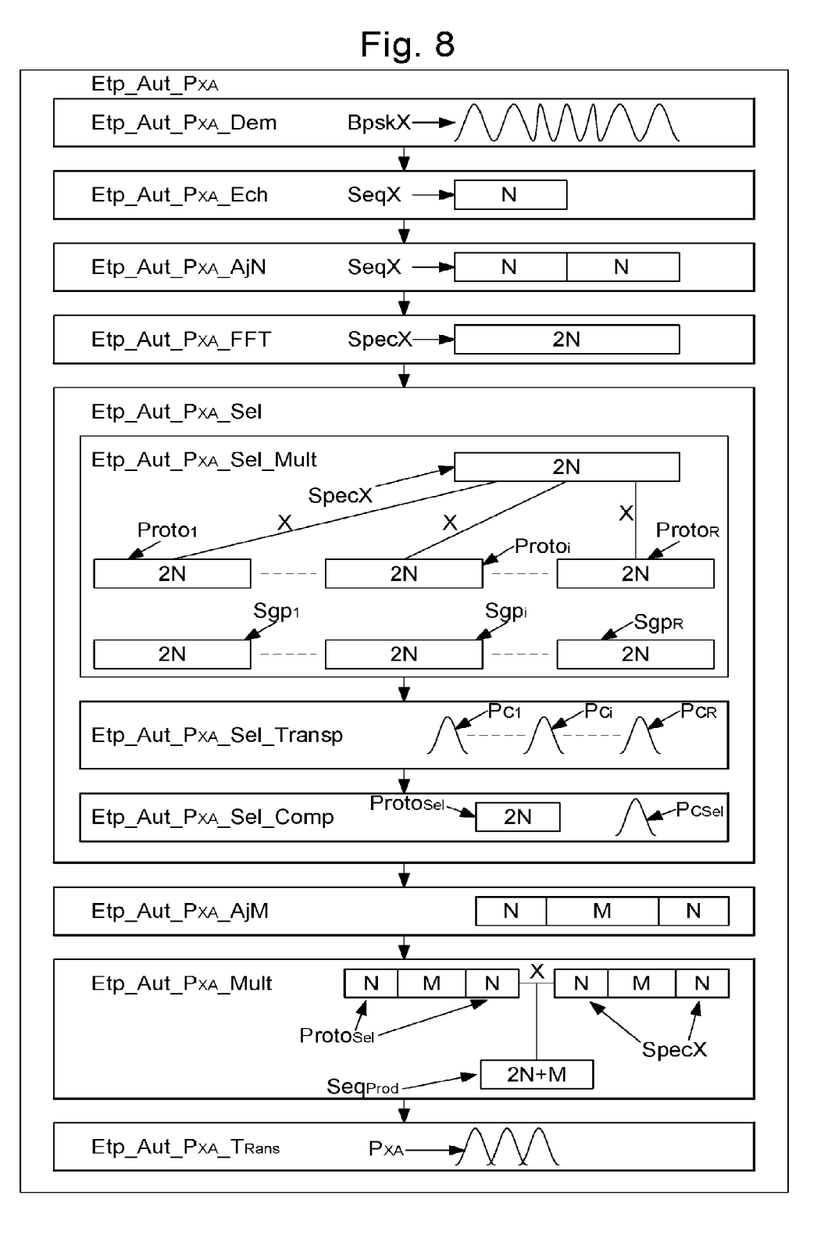
FIG. 8 shows a block diagram illustrating sub-steps of a step of the method of FIG. 3.

In a step Etp_Aut_$P_{XA}$ represented in FIG. 8, first transceiver A performs an autocorrelation of the first pulsed signal BpskX received by its BPSK receiver module RcA_Bpsk, in which a first autocorrelation peak $P_{XA}$ is detected. First autocorrelation peak $P_{XA}$ is represented, in particular, in FIG. 9. Step Etp_Aut_$P_{XA}$ includes the following sub-steps:

In a first sub-step Etp_Aut_$P_{XA}$_Dem, the first pulsed signal BpskX received is demodulated.

In a sub-step Etp_Aut_$P_{XA}$_Ech, the first demodulated pulsed signal is sampled at a sampling frequency, so as to form a pulsed sequence SeqX comprising N samples, N being a positive integer number. Said pulsed sequence SeqX includes, for example, 19,500 samples.

In a sub-step Etp_Aut_$P_{XA}$_AjN, N samples of zero value are added to the end of pulsed sequence SeqX, to form an extended sequence of 2N samples. For example, if N has a value of 19,500, the extended sequence includes 39,000 samples. This sub-step, known as zero-padding, allows the precision of a frequency spectrum of first pulsed signal BpskX to be increased to find maxima values.

In a sub-step Etp_Aut_$P_{XA}$_FFT, a frequency spectrum SpecX of the extended sequence is calculated, for example by DFT using a fast Fourier transform (FFT) algorithm. It is noted that frequency spectrum SpecX is of length 2N.

In a step Etp_Aut_$P_{XA}$_Sel, a prototype $Proto_{Sel}$ is selected from among R prototypes $(Proto_i)_{i=1 \ldots R}$, R being an integer number greater than 2. A prototype $Proto_i$ is a frequency spectrum of a BPSK signal sampled at a sampling frequency and to which N samples of zero value have been added. Said BPSK signal takes the form of a carrier of frequency $f_0+\delta f_i$ modulated by the aforementioned pseudo-random signal sequence. In one embodiment, prototypes $(Proto_i)_{i=1 \ldots R}$ are pre-stored in a register of first transceiver A. In such case, frequencies $f_0+\delta f_i$ are predetermined. Alternatively, prototypes $(Proto_i)_{i=1 \ldots R}$ are generated on reception of first pulsed signal BpskX, as a function of the range of error $\Delta e_{XA}$ between the reference frequency of first transceiver A $f_{refA}$ and that $f_{refX}$ of beacon X, said range of error $\Delta e_{XA}$ having been calculated in step Etp_Cal_$\Delta e_{XA}$. In such case, the frequency deviations $(\delta f_i)_{i=1 \ldots R}$ are chosen to be comprised within range of error $\Delta e_{XA}$, and such that said range of error $\Delta e_{XA}$ is entirely covered by the various frequency deviations $(\delta f_i)_{i=1 \ldots R}$. For example, for every i comprised between 1 and R, $\delta f_i = i/R \cdot \Delta e_{XA}$.

In both cases, prototype selection sub-step Etp_Aut_$P_{XA}$_Sel includes the following sub-steps:

In a sub-step Etp_Aut_$P_{XA}$_Sel_Mult, frequency spectrum SpecX is multiplied by each of the R prototypes $(Proto_i)_{i=1 \ldots R}$, which generates R product signals $(Sgp_i)_{i=1 \ldots R}$.

In a sub-step Etp_Aut_$P_{XA}$_Sel_Trans, each product signal $(Sgp_i)_{i=1 \ldots R}$ is transposed in the time domain. Each product signal $(Sgp_i)_{i=1 \ldots R}$ presents a peak, which is actually an autocorrelation peak $(Pc_i)_{i=1 \ldots R}$. Indeed, multiplication in the frequency domain is equivalent to correlation in the time domain. Further, it is noted that fewer calculations have to be performed to effect a multiplication in the frequency domain than to effect a correlation in the time domain: the complexity of the correlation algorithm in the time domain is $O(n^2)$, whereas it is $O(n \cdot \log(n))$ in the frequency domain.

In a sub-step Etp_Aut_$P_{XA}$_Sel_Comp, the amplitude of the autocorrelation peaks $(Pc_i)_{i=1 \ldots R}$ is compared. The prototype $Proto_{Sel}$ whose product signal $Sgp_{Sel}$ presents the highest autocorrelation peak $Pc_{Sel}$ is selected. The selected prototype $Proto_{Sel}$ is therefore that which maximises the autocorrelation peak-to-noise ratio for the most reliable possible autocorrelation peak identification. It is noted that the frequency deviation $\delta f_{Sel}$ of the selected prototype $Proto_{Sel}$ is an estimate of the error $e_{XA}$ between the reference frequency of the beacon X $f_{refX}$ and that of first transceiver A $f_{refA}$. This estimate is more accurate the higher R is.

In a sub-step Etp_Aut_$P_{XA}$_AjM, M samples of zero value are added to the centre of frequency spectrum SpecX, in accordance with the principle of zero-padding, so as to create an extended frequency spectrum including N+M+N samples, M being a positive integer number. This sub-step allows the sampling frequency of first pulsed signal BpskX to be artificially increased, in order to interpolate the signal in the time domain. If N has a value of 19000, M=1 048 576-39000 points are added for example. Interpolation makes it possible to finely determine the shape of the maxima of the temporal signal corresponding to the frequency spectrum.

In a sub-step Etp_Aut_$P_{XA}$_Mult, the extended frequency spectrum is multiplied by the extended selected prototype, which generates a product sequence $Seq_{Prod}$. The extended selected prototype is the selected prototype $Proto_{Sel}$ to the centre of which M samples of zero value have been added.

In a sub-step Etp_Aut_$P_{XA}$_Trans, the product sequence is transposed in the time domain, for example by an inverse fast Fourier transform (IFFT). The product sequence presents an autocorrelation peak, first autocorrelation peak $P_{XA}$. First autocorrelation peak $P_{XA}$ is of high resolution as a result of sub-step Etp_Aut_$P_{XA}$_AjM, and low amplitude as a result of sub-step Etp_Aut_$P_{XA}$_Sel. It is noted that the transposed product sequence may have several autocorrelation peaks as a result of multipath radio signal propagation, particularly because of refractions or reflections of first signal BpskX on various obstacles between beacon X and first transceiver A. First autocorrelation peak $P_{XA}$ is then the first of the peaks detected in time.

Figure 9:
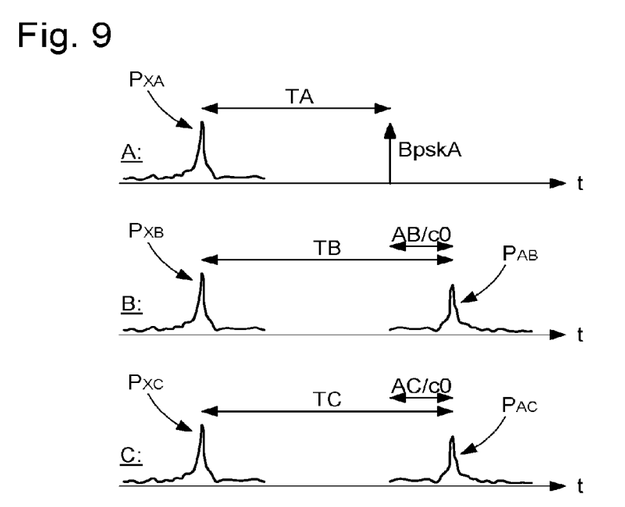
FIG. 9 shows a temporal diagram illustrating the transmissions and receptions of signals transmitted during the method of FIG. 3.

In a step Etp_Aut_$P_{XB}$ second transceiver B performs an autocorrelation of the first pulsed signal BpskX received, in which a second autocorrelation peak $P_{XB}$ is detected. Second autocorrelation peak $P_{XB}$ is represented in FIG. 9. This step is performed in a similar manner to step Etp_Aut_$P_{XA}$. Naturally, range of error $\Delta e_{XA}$ between reference frequency $f_{refA}$ of first transceiver A and that $f_{refX}$ of beacon X is replaced by range of error $\Delta e_{XB}$ between reference frequency $f_{refB}$ of second transceiver B and that $f_{refX}$ of beacon X.

In a step Etp_Aut_$P_{XC}$, third transceiver C performs an autocorrelation of the first pulsed signal BpskX received, in which a third autocorrelation peak $P_{XC}$ is detected. Third autocorrelation peak $P_{XC}$ is represented in FIG. 9. This step is performed in a similar manner to step Etp_Aut_$P_{XA}$. Naturally, range of error $\Delta e_{XA}$ between reference frequency $f_{refA}$ of first transceiver A and that $f_{refX}$ of beacon X is replaced by range of error $\Delta e_{XC}$ between reference frequency $f_{refC}$ of third transceiver C and that $f_{refX}$ of beacon X.

Figure 10:
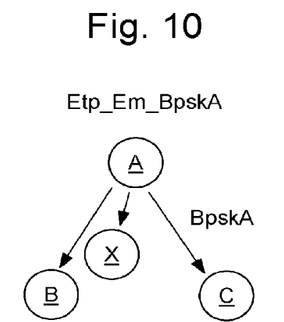
FIG. 10 is a schematic view of the localization system of FIG. 1, implementing a step of the method of FIG. 3.

In a step Etp_Em_BpskA represented in FIG. 10, first transceiver A transmits a second high-rate, narrow band pulsed BPSK signal BpskA. Second pulsed signal BpskA takes the form of a carrier at communication frequency $f_0$ (in the time base provided by the local oscillator of first transceiver A) modulated in phase by the aforementioned sequence of pseudo-random signals. Second pulsed signal BpskA is received by second transceiver B and third transceiver C, whose BPSK receiver modules RcB_Bpsk, RcC_Bps are still in detection mode Md_Det_Bpsk, as illustrated in FIG. 6.

In a step Etp_Aut_$P_{AB}$, second transceiver B performs an autocorrelation of the second pulsed signal BpskA received, in which a fourth autocorrelation peak $P_{AB}$ is detected. Fourth autocorrelation peak $P_{AB}$ is represented in FIG. 9. This step is performed in a similar manner to step Etp_Aut_$P_{XA}$. Naturally, range of error $\Delta e_{XA}$ between reference frequency $f_{refA}$ of first transceiver A and that $f_{refX}$ of beacon X is replaced by range of error $\Delta e_{AB}$ between reference frequency $f_{refA}$ of first transceiver A and that $f_{refB}$ of second transceiver B. It is noted that in this step, and more particularly in sub-step Etp_Aut_$P_{AB}$_Sel_Comp, the error $e_{AB}$ between reference frequency $f_{refA}$ of first transceiver A and that $f_{refB}$ of second transceiver B is estimated.

In a step Etp_Aut_$P_{AC}$, third transceiver C performs an autocorrelation of the second pulsed BPSK signal BpskA received, in which a fifth autocorrelation peak $P_{AC}$ is detected. Fifth autocorrelation peak $P_{AC}$ is represented in FIG. 9. This step is performed in a similar manner to step Etp_Aut_$P_{XA}$. Naturally, range of error $\Delta e_{XA}$ between reference frequency $f_{refA}$ of first transceiver A and that $f_{refX}$ of beacon X is replaced by range of error $\Delta e_{AB}$ between reference frequency $f_{refA}$ of first transceiver A and that $f_{refC}$ of third transceiver C. It is noted that in this step, and more particularly in sub-step Etp_Aut_$P_{AC}$_Sel_Comp, the error $e_{AC}$ between reference frequency $f_{refA}$ of first transceiver A and that $f_{refC}$ of third transceiver C is estimated.

In a step Etp_Cal_$T_A$, first transceiver A calculates a time difference $T_A$ between the time associated with first autocorrelation peak $P_{XA}$ (which is the time of reception by first transceiver A of first pulsed signal BpskX sent by beacon X), and the time of transmission of second pulsed signal BpskA by first transceiver A. Time difference $T_A$ is represented in FIG. 9.

In a step Etp_Cal_$T_B$, second transceiver B calculates a time difference $T_B$ between the time associated with second autocorrelation peak $P_{XB}$ (which is the time of reception by second transceiver B of first pulsed signal BpskX sent by beacon X), and the time associated with fourth autocorrelation peak $P_{AB}$ (which is the time of reception by second transceiver B of second pulsed signal BpskA sent by first transceiver A). Naturally, this time difference $T_A$ is expressed in the time base provided by the local oscillator of second transceiver B. Time difference $T_B$ is represented in FIG. 9.

In a step Etp_Cal_$T_{B'}$, second transceiver B caculates a time difference $T_B'$ corresponding to the transposition of time difference $T_B$ in the time base provided by the local oscillator of first transceiver A. Time difference $T_B'$ is equal to time difference $T_B$ multiplied by error $e_{AB}$ between reference frequency $f_{refA}$ of first transceiver A and that $f_{refB}$ of second transceiver B:

$$T_B'=T_B\cdot e_{AB}$$

Figure 11:
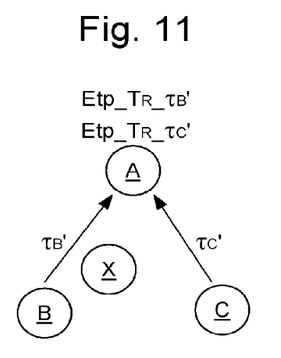
FIG. 11 is a schematic view of the localization system of FIG. 1, implementing steps of the method of FIG. 3.

In a step Etp_Tr_$T_{B'}$ represented in FIG. 11, second transceiver B transmits to first transceiver A time difference $T_B'$. Alternatively, second transceiver B transmits to first transceiver A time difference $T_B$, and error $e_{AB}$ between reference frequency $f_{refA}$ of first transceiver A and that $f_{refB}$ of second transceiver B. In this case, it is first transceiver A that performs the calculation of time difference $T_B'$.

In a step Etp_Cal_$T_C$, third transceiver C calculates a time difference $T_C$ between the time associated with third autocorrelation peak $P_{XC}$ (which is the time of reception by third transceiver C of first pulsed signal BpskX sent by beacon X), and the time associated with fifth autocorrelation peak $P_{AC}$ (which is the time of reception by third transceiver C of second pulsed signal BpskA sent by first transceiver A). Naturally, this time difference $T_C$ is expressed in the time base provided by the local oscillator of third transceiver C. Time difference $T_C$ is represented in FIG. 9.

In a step Etp_Cal_$T_{C'}$, third transceiver C calculates a time difference $T_C'$ corresponding to the transposition of time difference $T_C$ in the time base provided by the local oscillator of first transceiver A. Time difference $T_C'$ is equal to time difference $T_C$ multiplied by error $e_{AC}$ between reference frequency $f_{refA}$ of first transceiver A and that $f_{refC}$ of third transceiver C:

$$T_C'=T_C\cdot e_{AC}$$

In a step Etp_Tr_$T_{C'}$ represented in FIG. 11, third transceiver C transmits to first transceiver A time difference $T_C'$. Alternatively, third transceiver C transmits to first transceiver A time difference $T_C$, and error eAC between reference frequency $f_{refA}$ of first transceiver A and that $f_{refC}$ of third transceiver C. In this case, it is first transceiver A that performs the calculation of time difference $T_C'$.

In a step Etp_Cal_$\Delta t$, first transceiver A calculates the times-of-flight $\Delta t_1$, $\Delta t_2$ and $\Delta t_3$ defined by the following relations $$XA-AB=\Delta t_1\cdot c_0$$

$$XA-XC=\Delta t_2\cdot c_0$$

$$XB-XC=\Delta t_3\cdot c_0$$

where XA is the (unknown) distance separating beacon X and first transceiver A, XB is the (unknown) distance separating beacon X and second transceiver B, XC is the (unknown) distance separating beacon X and third transceiver C, AB is the distance (known by transceiver A) separating beacon X and second transceiver B, $c_0$ is the propagation speed of the signals exchanged between the various devices A, B, C, X.

Time-of-flight difference $\Delta t_1$ therefore corresponds to the difference of the time between transmission of first pulsed signal BpskX by beacon X and reception thereof by first transceiver A, and of the time between transmission of second pulsed signal BpskA by first transceiver A and reception thereof by second transceiver B. Further, time-of-flight difference $\Delta t_2$ corresponds to the difference of the time between transmission of first pulsed signal BpskX by beacon X and reception thereof by first transceiver A, and of the time between transmission of first pulsed signal BpskX by beacon X and reception thereof by third transceiver C. Finally, time-of-flight difference $\Delta t_3$ corresponds to the difference of the time between transmission of first pulsed signal BpskX by beacon X and reception thereof by second transceiver B, and of the time between transmission of first pulsed signal BpskX by beacon X and reception thereof by third transceiver C.

Time-of-flight differences $\Delta t_1$, $\Delta t_2$ and $\Delta t_3$ are calculated by first transceiver A according to the following formulae:

$$\Delta t_1=T_A-(T_B'-AB/c_0)$$

$$\Delta t_2=T_A-(T_C'-AC/c_0)$$

$$\Delta t_3=T_B'-AB/c_0-(T_C'-AC/c_0)$$

In a step Etp_Cal_PosX, first transceiver A solves the following system of three equations with 3 unknowns (XA, XB, XC):

$$XA = \Delta t_1 \cdot c_0 + AB$$

$$XC = XA - \Delta t_2 \cdot c_0$$

$$XB = \Delta t_3 \cdot c_0 + XC$$

and a position PosX of beacon X is deduced.

All the preceding steps may be performed again, so that first transceiver A has at least two positions of beacon X. Method METH then includes an additional step Etp_Filt_PosX of calculating a final position from the at least two positions, for example via a mean.

Figure 12:
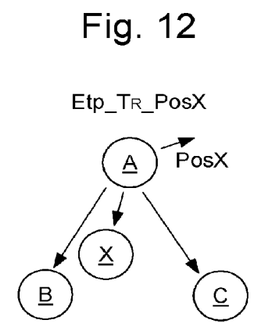
FIG. 12 is a schematic view of the localization system of FIG. 1, implementing a step of the method of FIG. 3.

In a step Etp_Tr_PosX represented in FIG. 12, A transmits the position PosX of X to second transceiver B, to third transceiver C, to beacon X and to a centralising unit. Alternatively, first transceiver A only transmits position Pos_X of X to one, two or three of these devices.

Naturally, the order of the steps presented above is not limiting, as the steps can be performed in any other technically possible order.

From the description that has just been given, several variants of the method and system for localizing a beacon can be devised by those skilled in the art without departing from the scope of the invention defined by the claims. For example, a 2D localization system comprising three transceivers A, B, C was presented. However, by integrating an additional transceiver in the localization system, it is possible to achieve 3D localization of a beacon, i.e. localization of a beacon not necessarily at zero height. The fundamental localization principles remain the same however.

What is claimed is:

1. A method for localizing a beacon by first, second and third transceivers, each of the beacon, the first, the second and the third transceivers comprising a local oscillator oscillating at different reference frequencies due to frequency drifts, the method comprising:

transmitting, by a first transceiver, an initiation signal, said initiation signal being received by second and third transceivers, calculating, using the initiation signal, errors between a reference frequency of the first transceiver and reference frequencies of the second and third transceivers as frequency reference errors, transmitting, by the beacon, a first pulsed signal, said first pulsed signal being received by the first, second and third transceivers, transmitting, by the first transceiver, a second pulsed signal, said second pulsed signal being received by the second and third transceivers, calculating, using the frequency reference errors, at least three differences between times-of-flight of the first and second pulsed signals, each time-of-flight difference being calculated in a base time of the first transceiver, and calculating a position of the beacon by time-of-flight differences.

2. The localization method according to claim 1, further comprising performing autocorrelation steps, of the first and second pulsed signals received by the first, second and third transceivers, the autocorrelation steps allowing detection and selection of autocorrelation peaks, and the time-of-flight differences being calculated of said autocorrelation peaks.

3. The localization method according to claim 2, wherein each autocorrelation step including a selection of the first peak detected on a time scale, from among a plurality of detectable autocorrelation peaks.

4. The localization method according to claim 2, wherein each performance of the autocorrelation steps of a pulsed signal further comprises:

calculating a frequency spectrum of the pulsed signal, multiplying said frequency spectrum with a second frequency spectrum at a frequency $f_0 + \delta f_{Sel}$, where $f_0$ is a frequency of the pulsed signal, and $\delta f_{Sel}$ is a reference frequency error between the device having transmitted the pulsed signal and a transceiver having received said pulsed signal, said second frequency spectrum being called a selected prototype, and transposing in a time domain a product sequence which is a result of the multiplication.

5. The localization method according to claim 4, wherein each of the autocorrelation steps of a pulsed signal including a sub-step of interpolation of the product sequence.

6. The localization method according to claim 1, further comprising steps, performed on a reception of initiation signal by the beacon, of:

transmitting, by the beacon, an activation signal, including a request for activation of the receiver modules of the first, second and third transceivers, said modules acquiring the first and second pulsed signals, and calculating, using said initiation signal, of errors between a reference frequency of the beacon and reference frequencies of the first, second and third transceivers.

7. The localization method according to claim 6, wherein each step of calculating a reference frequency error between a device having transmitted the initiation signal or the activation signal and a transceiver receiving a signal further comprises:

analyzing a temporal evolution of a frequency spectrum of signals received by the transceiver, to identify a characteristic line of the initiation signal, calculating, in a time base provided by a local oscillator of the transceiver, a range of error between a modulation frequency of the initiation signal, and a frequency of said characteristic line of the initiation signal, and calculating the reference frequency error by ranges of error.

8. The localization method according to claim 1, wherein the initiation signal has a different frequency than the second pulsed signal.

* * * * *